United States Patent

[11] 3,568,648

[72] Inventor George Robert Cass
       Montreal, Quebec, Canada
[21] Appl. No. 738,699
[22] Filed June 20, 1968
[45] Patented Mar. 9, 1971
[73] Assignee Canadian National Railway Company
       Montreal, Quebec, Canada
[32] Priority May 22, 1968
[33] Canada
[31] 020,647

[54] WATER TEMPERATURE CONTROL FOR DIESEL ENGINES
24 Claims, 4 Drawing Figs.
[52] U.S. Cl. .................................................. 123/41.15
[51] Int. Cl. ................................................... F01p 11/14
[50] Field of Search ......................................... 123/41.15;
       236/(Transistor Digest)

*Primary Examiner*—Wendell E. Burns
*Attorney*—Fetherstonhaugh & Co.

ABSTRACT: Apparatus for controlling the temperature of a coolant in a circulating coolant system for an engine. The temperature of the coolant is sensed at various points in the system by probes which produce an output voltage proportional to temperature. The probe voltages are compared with predetermined "set" voltages so that if a probe's voltage exceeds its associated "set" voltage, cooling means, warning means, engine shut down means or other suitable means is actuated.

INVENTOR
GEORGE R. CASS
BY Featherstonhaugh & Co.
ATTORNEYS

WATER TEMPERATURE CONTROL FOR DIESEL ENGINES

This invention relates to apparatus for controlling the temperature of a coolant in a circulating coolant system. In particular, it relates to a system for controlling the temperature of coolant for an internal combustion engine, e.g. in a locomotive.

The purpose of an engine coolant temperature controller on a locomotive is to control the operation of various cooling functions between the limits of no cooling and full cooling. If, under full cooling, the coolant temperature still continues to rise, the controller should activate an alarm to alert the crew, and if a further temperature increase occurs, the locomotive should be automatically shut down to prevent engine damage.

The prior art in coolant temperature control consisted of using mercury thermometers modified to act as thermostats. Their contact closure was then used to energize or deenergize relays which controlled various cooling operations within the locomotive. These could be any combination of louvres (vents) and fans.

The thermometers had probes inserted at various levels so that as the mercury column rose it would act as a conductor closing a circuit which activated a relay. Problems encountered with this system were mainly due to the splitting of the mercury column either from vibration encountered in the locomotive or from voltage transients and current surges produced from relays being deenergized and energized.

The present invention utilizes mechanically protected thermistors and electronic circuitry to activate the various control relays and is more reliable in a locomotive environment. The coolant temperature controller according to the invention controls the operation of various cooling functions between the limits of no cooling and full cooling. If, however, under full cooling, the water temperature still continues to rise, the controller will activate an alarm to alert the crew. A further temperature increase will shut down the locomotive to prevent engine damage.

According to the invention there is provided apparatus for controlling temperature of a coolant in a circulating coolant system comprising probe means for sensing the temperature of the coolant at a point in the system. The probe means produces a voltage substantially proportional to the coolant temperature. This voltage is applied to one input of comparison means having a second input to which is applied a reference voltage. The comparison means has a first output level when the voltage of the probe is below the reference voltage and a second output level when the voltage of the probe is above the reference voltage. The output of the comparison means is applied to an input of amplifier means responsive to changes in the output level of the comparison means to actuate regulating means for regulating the temperature of the coolant.

The regulating means may be any combination of louvres (vents) and fans.

Preferably a number of comparison means are provided, each comparison means having the probe voltage as one input and a reference voltage as its other input. That is, the reference voltage to each comparator is different and is related to probe temperature so that as the temperature of the probe rises or falls throughout a certain range, more or fewer temperature regulating means are activated.

Preferably, means are provided for indicating an open circuit of the probe.

The aforementioned probe is preferably located to sense the temperature of the coolant just after it leaves the radiator and may be termed a cool water probe assuming, for simplicity, that the coolant is simply water. Naturally it could contain antifreeze, for example. A further probe may be provided to sense the temperature of the water after it leaves the engine and this probe may be termed a hot water probe.

In case the cool water probe should be short circuited, it is preferable that means be provided so that the hot water probe may take over control and initiate full cooling if it senses a coolant temperature above a first predetermined temperature. If the hot water probe senses a temperature above a second predetermined temperature, it may be arranged to actuate an alarm to warn the crew that something is amiss. The hot water probe may also be arranged to shut down the engine or perform some other function if it senses a temperature above a third predetermined temperature, i.e. a temperature above which engine damage might occur.

Means are also preferably provided for indicating malfunction of the hot water probe due to open circuiting of it.

A further probe may be provided to indicate loss of coolant. This probe is provided at a suitable location in the cooling system such that if the water goes below this critical level, the engine is in danger of overheating. This loss of water probe is identical to the other two probes except that it has a continuously operating heater associated with it. All of the probes are preferably of the type employing a thermistor bead. Ordinarily, without the heater, if loss of water occurred the thermistor bead in the loss of water probe would only provide an output proportional to the temperature of the surrounding air in the pipe. With the heater, and water at normal levels the heater has very little effect on the thermistor bead temperature because it is immersed in continuously circulating water. When loss of water occurs, the heater is able to heat the thermistor bead to a level sufficient to activate a comparator module denoting loss of water in the cooling system and the engine is shut down.

The invention will now be further described in conjunction with the accompanying drawings, wherein.

Figure 1:
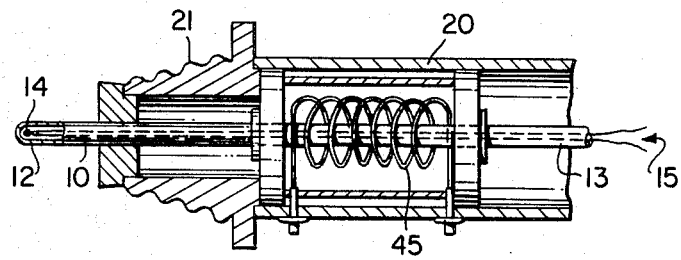
FIG. 1 shows a probe which may be used in the coolant flow control system of the present invention.

The construction of the probes is shown in FIG. 1. The probe comprises a hollow metal tube 10 having a closed end 12 and an open end 13. A thermistor bead 14 is contained in the hollow tube 10 adjacent the closed end 12 and has a pair of leads 15 extending from the open end 13 of the tube. The tube 10 is supported within a body member 20 having an externally threaded end 21 adapted to cooperate with an internally threaded opening in the coolant system (not shown) whereby the body member 20 may be mounted with the closed end 12 of the tube 10 extending into the coolant. Seals are provided as shown to prevent leakage of coolant along the tube 10. The heater is provided only on the loss of water probe for a purpose which will be made clear subsequently herein.

It will be appreciated that the thermistor is mechanically protected from the cooling water (which may contain corrosive agents) by the tube 10 so that water may not contact the thermistor. The tube 10 is preferably of metal, e.g. brass and may be packed with silicone grease so that variations in the temperature of the coolant are rapidly transmitted to the thermistor bead 14.

Figure 2:
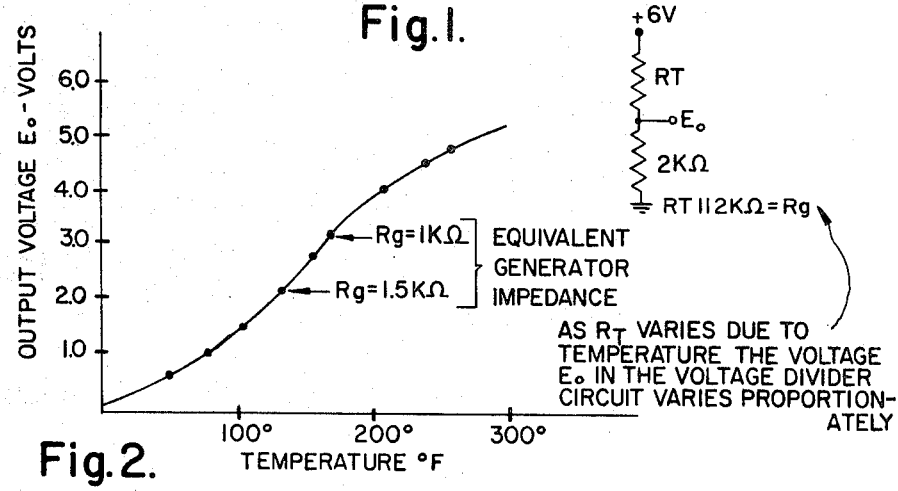
FIG. 2 is a graph showing output voltage versus temperature for a thermistor which may be used in the probe of FIG. 1.

FIG. 2 shows the variation of the thermistors characteristics with temperature. The upper right hand portion of FIG. 2 shows the thermistor connected in series with a resistor, e.g. 2K⅝ to form a voltage divider circuit. An output voltage $E_0$ may be taken across the 2K⅝ resistor. Variations in resistance of the thermistor $R_T$ result in variations of the output voltage $E_0$ across the 2K⅝ resistor.

Figure 3:
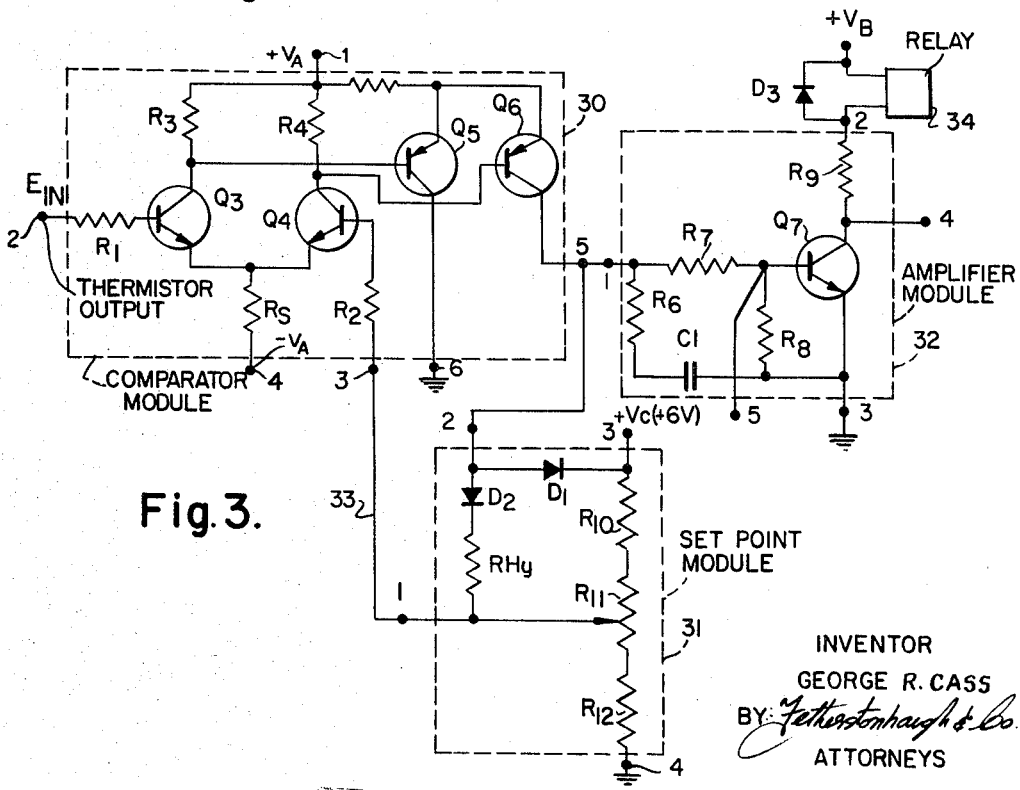
FIG. 3 is a schematic diagram of a comparator module, set point module and amplifier module used in the system according to the invention.

FIG. 3 shows three basic modules suitable for use in the present invention, a comparator module 30, a "set point" module 31 and an amplifier module 32.

Resistors $R_{10}$, $R_{11}$ and $R_{12}$ in the set point module 31 are used to set a reference voltage proportional to temperature (see FIG. 2) for the difference amplifier comprising transistors $Q_3$ and $Q_4$ in the comparator module 30. If the voltage level from the probe to the base of transistor $Q_3$ is lower than the reference voltage applied to the base of transistor $Q_4$ by the set point module 31 (over line 33), then $Q_4$ will be conducting and transistor $Q_3$ will be cut off. The collector of transistor $Q_4$ is connected to the base transistor $Q_6$ so that when transistor $Q_4$ is conducting, it will cause transistor $Q_6$ to conduct. Conduction of transistor $Q_6$ will allow current to flow into the base of transistor $Q_7$ in the amplifier module 32 thus holding it in a conducting state and thus holding the relay 34 continuously energized unless the probe voltage applied to the base of $Q_3$ rises, due to an increase in coolant temperature, to a voltage equal to or slightly greater than that applied to the base of $Q_4$ by the set point module 31.

First and second control resistors $R_3$ and $R_4$ are connected between the collectors of transistors $Q_3$ and $Q_4$, respectively, and supply terminal 1 as shown.

The relay 34 has contacts (not shown) which are open when the relay coil is energized and closed when it is deenergized. This provides for "fail-safe" operation in that the contacts close regardless of the reason (for example battery failure) for deenergization of the relay coil.

The output of transistor $Q_6$ also provides a hysteresis feature when it conducts into resistor $R_{hy}$. Due to the current flowing through $R_{hy}$ the potential at point 1 of the set point module 31 is higher than it normally would be if transistor $Q_6$ were not conducting.

As the temperature of the probe rises to a point where $Q_3$ begins to conduct, transistor $Q_5$ also begins conducting while transistors $Q_4$ and $Q_6$ cease conduction. With transistor $Q_6$ off, the potential at point 5 of the comparator module 30 becomes open circuit thus lowering the potential at point 1 of the set point module 31. This lowering of potential at point 1 of the setpoint module 31 occurs because current due to the potential at point 2 of the set point module 31 ceases flowing through resistor $R_{hy}$ and the lower portion of the potentiometer, i.e. below the adjustable tap. This lowering of potential at point 1 of the set point module 31 further ensures that transistor $Q_3$ stays conducting and $Q_4$ stays cut off. The lowering of potential at point 1 of the set point module 31 can be set at any value depending on resistor choice, normally set at a voltage equivalent to about 3° F. Thus the probe voltage $E_{in}$, as a result of cooling, must drop a certain amount below the value which was initially required to turn on transistor $Q_3$. This hysteresis feature prevents abnormally fast cycling of a specific cooling operation.

When transistor $Q_6$ ceases conduction, the base drive of the normally continuously conducting transistor $Q_7$ is removed to that transistor $Q_7$ stops conducting thus deenergizing relay 34 which brings on a specific cooling operation. That is, the relay 34 controls equipment (not shown) for influencing the rate of cooling of the coolant.

The resistor $R_{hy}$ in the set point module 31 allows the potential at point 1 in the set point module 31 to be raised or lowered by a predetermined amount. Thus several degrees of cooling must occur before the cooling operation is stopped and conversely several degrees of heating must occur before the cooling operation again begins. The diodes $D_1$ and $D_2$ in the set point module 31 are used to prevent the potential at points 3 and 1 of the set point module from affecting the operation of the amplifier module 32. These potentials would otherwise be presented directly into the base of transistor $Q_7$ which would then conduct continuously regardless of the output from the comparator module 30.

The network preceding transistor $Q_7$ in the amplifier module 32 serves three purposes:

a. Resistor $R_8$ provides a slight off bias for the base of $Q_7$ ensuring that when transistor $Q_7$ is required to be nonconducting it will stay that way;

b. resistor $R_7$ is a current limit for the base drive of transistor $Q_7$; and c. resistor $R_6$ and capacitor $C_1$ provide a high frequency noise filter.

Diode $D_3$ in parallel with the relay 34 prevents any large voltage transients induced during deenergization of the relay from exceeding the sustaining voltage of transistor $Q_7$ and thus destroying it.

Figure 4:
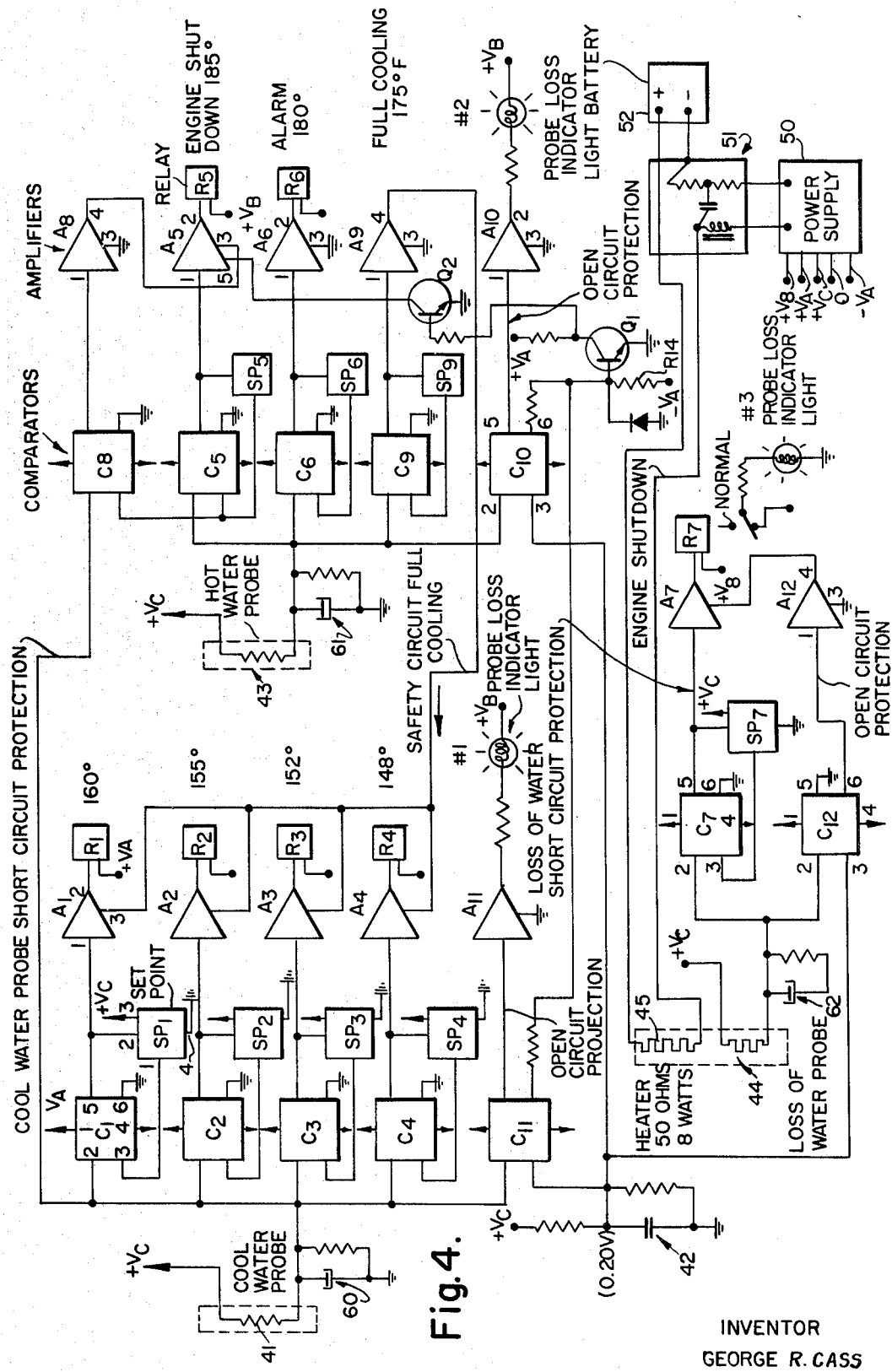
FIG. 4 is a detailed, partly block, partly schematic, diagram of a system according to the invention for controlling the temperature of coolant in a circulating coolant system.

The various terminals of the modules have been numbered in FIG. 3. In FIG. 4, the modules are shown in block form only but a number of the terminals have been provided with numbers which correlate with the terminal numbers given in FIG. 3. For production efficiency, each of the comparator modules are preferably made identical, the same being true for the set point and amplifier modules. The number of modules used are a function of the degree of temperature control required. FIG. 4 is a diagram of a three-probe, fail-safe water temperature controller but this may easily be simplified to a one-probe three-relay operation.

Terminal 4 is only used in amplifier modules $A_6$, $A_9$ and $A_{12}$ and terminal 5 is only used in amplifier module $A_5$. Terminal 4 of these modules provides a near ground potential through saturated transistor $Q_7$ for other amplifier modules. Amplifier module $A_{12}$ provides a ground for $A_7$, amplifier $A_8$ provides a ground for $A_5$, and amplifier $A_9$ provides a ground for amplifiers $A_1$, $A_2$, $A_3$ and $A_4$. If $Q_1$ and $Q_2$ in FIG. 4 ground terminal 5 of amplifier $A_5$, the function of comparator $C_5$ is nullified because the base of $Q_7$ in amplifier module $A_5$ is then grounded.

The arrangement shown in FIG. 4 comprises a cool water probe 41 for sensing the temperature of coolant at a point in a cooling system, e.g. a cooling system of a locomotive. The probe means 41 produces a voltage substantially proportional to the coolant temperature and this voltage is applied to one input of comparison means having a second input to which is applied a reference voltage. In this case, the voltage of probe 41 is applied to one input of each of comparator means $C_1$, $C_2$, $C_3$, $C_4$ and $C_{11}$. Comparators $C_1$ to $C_4$ each have a reference voltage applied as a second input (on their number 3 terminal) by set point circuits $SP_1$ to $SP_4$, respectively. Each comparator $C_1$ to $C_4$ has a first output level (high) when the voltage of the probe 41 is below the reference voltage and a second output level (low) when the voltage of the probe is above said reference voltage. Each comparator means $C_1$ to $C_4$ has its output connected to an associated amplifier $A_1$ to $A_4$. Normally these amplifiers are conducting but when the probe voltage exceeds the "set point" voltage of a comparator, it cuts off the associated amplifier which releases the associated relay $R_1$, $R_2$, $R_3$ or $R_4$. The reference voltages applied to the comparators $C_1$ to $C_4$ are set by the set point circuits $SP_1$ to $SP_4$ at different levels corresponding to different coolant temperature. Thus, relay $R_4$ may be activated at a coolant temperature of 148° F., relay $R_3$ at a temperature of 152° F., relay $R_2$ at a temperature of 155° F. and relay $R_1$ at a temperature of 160° F. These relays $R_1$ to $R_4$ may actuate any combination of louvres (vents) and fans.

The comparator $C_{11}$ has an input from the cool water probe 41 and, as a reference input, a voltage from the circuit generally indicated as 42 which applies a low voltage of, for example, 0.20 volts. Throughout the normal range of operation of the probe, the voltage of the probe 41 always exceeds the reference voltage applied to comparator $C_{11}$ to that comparator $C_{11}$ has a low level output insufficient to drive amplifier $A_{11}$. However, should the probe become open circuited, its voltage would drop to zero so that comparator $C_{11}$ would change its output from a low output level to a high output level thus turning on amplifier $A_{11}$ and hence turning on the probe loss indicator light No. 1.

The reference voltage for each comparison means $C_1$ to $C_4$ is manually adjustable by adjusting the tap on the potentiometer $R_{11}$ (FIG. 3).

The cool water probe 41 is responsive to the temperature of coolant after passage through a radiator (not shown) forming part of a coolant system for an internal combustion engine, e.g. in a locomotive.

A further probe 43 is provided which is responsive to the temperature of the coolant after heating by the engine and hence may be termed a hot water probe. The output of this probe is connected to comparator means $C_5$, $C_6$, $C_9$ and $C_{10}$. If the hot water probe detects a temperature in excess of a first predetermined temperature, e.g. 175° F., the output of comparator module $C_9$ drops so that amplifier $A_9$ cuts off. This raises the potential on terminal 4 of amplifier $A_9$ and this is applied to terminal 3 of each of amplifiers $A_1$ to $A_4$ so that relays $R_1$ through $R_4$ are deactivated and hence cause maximum cooling to occur.

If the temperature detected by hot water probe 43 is still higher, e.g. 180° F., the output of comparator $C_6$ drops and relay $R_6$ is released to activate an alarm to warn the locomotive crew that something is wrong.

Should the temperature detected by the hot water probe 43 exceed a third predetermined temperature, e.g. 185° F., the output of comparator $C_5$ drops and relay $R_5$ is released. This can be arranged to cause engine shutdown or perhaps some other action not quite as drastic as engine shutdown by means not shown but well known to those skilled in the art so that detailed explanation is believed unnecessary. For example relay $R_5$ could simply actuate means to stop the supply of fuel to the engine.

The reference voltage for comparator $C_{10}$ is provided by the same circuitry indicated generally at 42 that provides a reference voltage for comparator $C_{11}$ so that if the hot water probe 43 becomes open circuited, the output of comparator $C_{10}$ rises so that an output appears on amplifier $A_{10}$ and turns on probe loss indicator light No. 2.

The set point circuit $SP_5$ applies a reference voltage to a comparator $C_8$ as well as to the comparator $C_5$. The other input of comparator $C_8$ as well as to the comparator $C_5$. The other input of comparator $C_8$ is from the cool water probe 41. If probe 41 short circuits it causes a sharp increase in the input voltage to comparator $C_8$ so that its output drops to a low level. This cuts off amplifier $A_8$ which applies an increases voltage from its terminal 4 to the terminal 3 of amplifier $A_5$. This cuts off amplifier $A_5$ which in turn releases relay $R_5$ to cause engine shutdown, for example.

When hot water probe 43 is functioning properly, current flows from terminal 6 of comparator module $C_{10}$ to the negative voltage source $-V_a$ via resistor $R_{14}$. This causes a positive bias to be applied to the base of NPN transistor $Q_1$ so that it is conducting. The collector of transistor $Q_1$ is connected to the base of NPN transistor $Q_2$ which has its emitter grounded and its collector connected to terminal 5 of amplifier module $A_5$. When transistor $Q_1$ is conducting, $Q_2$ is cut off. However, if probe 43 should become open circuited, an output would appear on terminal 5 of the comparator module $C_{10}$ whereas the output on terminal 6 would disappear hence removing the bias from the base of the transistor $Q_1$ which would then cut off. The resulting increase in the potential at the collector of $Q_1$ would be applied to the base of transistor $Q_2$ making it conducting and hence effectively grounding terminal 5 of amplifier $A_5$. This grounding of terminal 5 of amplifier $A_5$ prevents it from operating, i.e. cuts its off thus releasing relay $R_5$ to shut down the engine.

A further probe 44, termed a loss-of-water probe, may be provided at a suitable location in the cooling system, such that if the water goes below this critical level, the engine is in danger of over heating. This probe is provided with a heater 45 (see also FIG. 1). This probe is identical to the other two probes except for the heater which is continuously operating and provides low heating power, e.g. 8 watts. Ordinarily, without this heater, if loss of water occurred, the thermistor bead would only provide an output proportional to the temperature of the surrounding air in the pipe in which it is mounted. With the heater on, and water at normal level, the heater has very little effect on the bead temperature since it is immersed in continuously circulating water. When loss of water occurs the heater is able to heat the thermistor bead to a level sufficient to activate a comparator module $C_7$ denoting loss of water in the cooling system. Activation of comparator module $C_7$ releases a relay $R_7$ which causes engine shutdown or some other function in a similar manner as relay $R_5$. Engine shutdown, or perhaps some other less drastic action, also occurs upon short circuiting of the loss of water probe 44 because this also results in an increased input on terminal 2 of comparator module $C_7$. The output of the probe 44 is also applied to terminal 2 of a comparator $C_{12}$ having as a reference voltage the voltage from the circuitry 42. The voltage from circuitry 42 is less than the voltage normally provided by probe 44 so that comparator module $C_{12}$ produces an output on its terminal 6 which is applied to terminal 1 of amplifier $A_{12}$ which is therefore conductive. Terminal 4 of amplifier $A_{12}$ is connected to terminal 3 of amplifier $A_7$ to provide a ground for amplifier $A_7$. Should the loss of water probe 44 become open circuited, the voltage on terminal 2 of comparator $C_{12}$ would disappear and the output on terminal 6 of comparator $C_{12}$ would disappear so that amplifier $A_{12}$ would cut off eliminating the ground connection for amplifier $A_7$ which then would cut off releasing relay $R_7$ to shut down the engine and activate probe loss indicator light No. 3. The various voltages $+V_a$, $+V_b$, $+V_c$, 0 (ground) and $-V_a$ are provided by a power supply 50 connected through a network 51 to a battery 52, e.g. a 72 volt battery on a locomotive. The details of the power supply 50 are not pertinent to the present invention and hence are not shown. If desired, separate supplies could be provided for the various voltages used in the circuitry of the invention. The network connected between the battery and power supply is used for voltage dropping, e.g. from plus 72v. to plus 12v., and also for transient voltage filtering.

The probes 41, 43 and 44 may be provided with networks 60, 61 and 62, respectively, for smoothing purposes to nullify any voltage transients which might be induced in the circuitry during normal locomotive operation. Electrolitic capacitors may be used in the networks 60, 61 and 62.

I claim:

1. Apparatus for controlling temperature of a coolant in a circulating coolant system comprising probe means for sensing the temperature of said coolant at a point in said system, said probe means producing a voltage substantially proportional to said temperature, said voltage being applied to one input of comparison means having a second input to which is applied a reference voltage, said comparison means having a first output level when the voltage of said probe is below said reference voltage and a second output level when the voltage of said probe is above said reference voltage, the output of said comparison means being applied to an input of amplifier means responsive to changes in the output level of said comparison means to actuate regulating means for regulating the temperature of said coolant.

2. Apparatus as claimed in claim 1 wherein the voltage of said probe is also applied as an input to a plurality of additional comparison means each having a second input to which is applied a different reference voltage, each comparison means having a first output level when the voltage of said probe is below the reference voltage applied to its second input and a second output level when the voltage of said probe is above the reference voltage applied to its second input, the output of each comparison means being applied to an input of a different amplifier means, there being a different amplifier associated with each comparison means, each amplifier means being responsive to changes in the output level of its associated comparison means to actuate regulating means associated therewith for regulating the temperature of said coolant.

3. Apparatus as claimed in claim 2 wherein the reference voltage for each comparison means is manually adjustable.

4. Apparatus as claimed in claim 2 wherein each different reference voltage is related to a different temperature of said coolant.

5. Apparatus as claimed in claim 2 wherein a further comparison means is provided having the voltage of said probe applied to one input and a reference voltage applied to a second input, the reference voltage applied to the second input of said further comparison means being lower than any range of voltages adapted to be produced by said probe when sensing the temperature of said coolant, said further comparison means producing an output unless the output from said probe is interrupted in which case its output ceases and causes actuation of a warning mechanism.

6. Apparatus as claimed in claim 2 wherein the reference voltage for each comparison means is provided by a set point circuit, there being a different set point circuit associated with each comparison means, each set point circuit having means for introducing a hyteresis function in the voltage applied to the second input of its associated comparison means whereby the output of its associated comparison means changes from said first level to said second level at a value of probe voltage slightly higher than a value of probe voltage which will cause the output of the associated comparison means to change from said second level to said first level.

7. Apparatus as claimed in claim 6 wherein each set point circuit comprises a potentiometer having a substantially constant voltage applied across it, said potentiometer having an adjustable tap connected to the second input of its associated comparison means.

8. Apparatus as claimed in claim 7 wherein each said set point circuit includes means for increasing the voltage at said adjustable tap when the output of its associated comparison means is at said second level.

9. Apparatus as claimed in claim 8 wherein said potentiometer has a first end connected to a positive DC voltage source and a second end connected to ground and the means for increasing the voltage at said adjustable tap when the output of its associated comparison means is at said second level comprises a first diode and a second diode, each having an anode and a cathode, said first diode having its anode connected to the anode of said second diode and to the output of the associated comparison means, the cathode of said first diode being connected to the first end of said potentiometer and the cathode of said second terminal connected to said adjustable tap.

10. Apparatus as claimed in claim 1, wherein said probe comprises a hollow elongated metal tube having a closed end and an open end, said closed end being adapted to be inserted in said coolant, a thermistor being contained in said tube adjacent said closed end and having electrical leads extending from said open end.

11. Apparatus as claimed in claim 4, wherein said probe comprises a hollow elongated metal tube having a closed end and an open end, said closed end being adapted to be inserted in said coolant, a thermistor being contained in said tube adjacent said closed end and having electrical leads extending from said open end.

12. Apparatus as claimed in claim 7, wherein said probe comprises a hollow elongated metal tube having a closed end and an open end, said closed end being adapted to be inserted in said coolant, a thermistor being contained in said tube adjacent said closed end and having electrical leads extending from said open end.

13. Apparatus as claimed in claim 2 wherein the coolant system is adapted to cool an internal combustion engine and said coolant is heated by said engine and cooled by a radiator and said probe is responsive to the temperature of the coolant after passage through said radiator.

14. Apparatus as claimed in claim 13 comprising a further probe responsive to the temperature of said coolant after heating by said engine, said further probe being connected to means adapted to cause full cooling of said engine upon detection of a temperature above a first predetermined temperature and to means adapted to actuate or alarm upon detection of a temperature above a second predetermined temperature and to means adapted to shut down the engine upon detection of a temperature above a third predetermined temperature.

15. Apparatus as claimed in claim 14 comprising a third probe adapted to detect loss of coolant from said coolant system below a predetermined minimum, said third probe being connected to means for shutting down said engine upon detection of loss of coolant below said predetermined minimum or upon short circuiting or open circuiting of said third probe.

16. Apparatus as claimed in claim 15 including means for indicating open circuiting of said further probe.

17. Apparatus as claimed in claim 15 wherein said third probe is provided with an electrical heater, said heater producing insufficient heat to influence said third probe when it is immersed in coolant but causing said third probe to produce an output when said third probe is not immersed in coolant.

18. Apparatus as claimed in claim 2, wherein said probe comprises a hollow elongated metal tube having a closed end and an open end, said closed end being adapted to be inserted in said coolant, a thermistor being contained in said tube adjacent said closed end and having electrical leads extending from said open end.

19. Apparatus as claimed in claim 3, wherein said probe comprises a hollow elongated metal tube having a closed end and an open end, said closed end being adapted to be inserted in said coolant, a thermistor being contained in said tube adjacent said closed end and having electrical leads extending from said open end.

20. Apparatus as claimed in claim 5, wherein said probe comprises a hollow elongated metal tube having a closed end and an open end, said closed end being adapted to be inserted in said coolant, a thermistor being contained in said tube adjacent said closed end and having electrical leads extending from said open end.

21. Apparatus as claimed in claim 6, wherein said probe comprises a hollow elongated metal tube having a closed end and an open end, said closed end being adapted to be inserted in said coolant, a thermistor being contained in said tube adjacent said closed end and having electrical leads extending from said open end.

22. Apparatus as claimed in claim 8, wherein said probe comprises a hollow elongated metal tube having a closed end and an open end, said closed end being adapted to be inserted in said coolant, a thermistor being contained in said tube adjacent said closed end and having electrical leads extending from said open end.

23. Apparatus as claimed in claim 9, wherein said probe comprises a hollow elongated metal tube having a closed end and an open end, said closed end being adapted to be inserted in said coolant, a thermistor being contained in said tube adjacent said closed end and having electrical leads extending from said open end.

24. Apparatus as claimed in claim 16 wherein said third probe is provided with an electrical heater, said heater producing insufficient heat to influence said third probe when it is immersed in coolant but causing said third probe to produce an output when said third probe is not immersed in coolant.